United States Patent [19]

Coccoli

[11] Patent Number: 4,514,088
[45] Date of Patent: Apr. 30, 1985

[54] SINGLE-COUPLER GUIDED-WAVE PASSIVE RESONANT-RING OPTICAL-GYRO INSTRUMENT

[75] Inventor: Joseph D. Coccoli, Sudbury, Mass.

[73] Assignee: The Charles Stark Draper Laboratory, Inc., Cambrige, Mass.

[21] Appl. No.: 481,481

[22] Filed: Apr. 1, 1983

[51] Int. Cl.³ .................... G01B 9/02; G01C 19/64
[52] U.S. Cl. ................................................ 356/350
[58] Field of Search .................................... 356/350

[56] References Cited

U.S. PATENT DOCUMENTS

4,326,803 4/1982 Lawrence ..................... 356/350

Primary Examiner—Vincent P. McGraw
Attorney, Agent, or Firm—Joseph S. Iandiorio; William E. Noonan

[57] ABSTRACT

A single-coupler guided-wave passive resonant-ring optical gyro system responsive to a coherent light source including: an optical-fiber resonant ring, a single directional coupler that serves as an input for exciting clockwise and counterclockwise traveling wave resonances in the resonant ring and serves as an output for extracting the ouput signals representative of those resonant traveling waves; switching means for selectively alternately applying the light waves from the coherent light source to the clockwise and counterclockwise inputs of the single directional coupler; means for separating the resonant frequencies of orthogonal polarization states of the resonant ring; means for tuning the frequency of the input light waves to the resonant frequencies of the resonant ring; and means for sensing the output signal representative of the clockwise and counterclockwise waves.

7 Claims, 8 Drawing Figures

SINGLE-COUPLER GUIDED-WAVE PASSIVE RESONANT-RING OPTICAL-GYRO INSTRUMENT

FIELD OF INVENTION

This invention relates to a single-coupler guided-wave passive resonant-ring optical-gyro instrument.

BACKGROUND OF INVENTION

Resonant-ring optical gyros rely on the frequency differences of resonant states in the ring between oppositely directed traveling electromagnetic waves resulting from the Sagnac effect to sense rotation rate. Empty or passive-ring gyros using mirrors exhibit lower performance because of the difficulty in suppressing unwanted higher-order transverse-mode resonances. Sagnac interferometer types of passive optical gyros use a coil of optical fiber instead of mirrors to develop a phase difference between the outputs of the clockwise and counterclockwise waves which is manifest as a shift in the interference pattern that varies with gyro rotation rate. But the Sagnac approach requires a long length of optical fiber and suffers from the presence of two orthogonal states of polarization, the difference in phase velocities of which is sensitive to environmental factors such as temperature, stress and magnetic fields. Also, to sense rotation, Sagnac gyros use an interference pattern phase shift detector with which it is more difficult to measure very small phase differences representative of small rates of rotation. Conventional passive resonant-ring optical gyros use two couplers—one coupler to simultaneously excite clockwise and counterclockwise traveling wave resonances and the other coupler to extract output signals representative of those waves. Two couplers require more precise and costly manufacturing to insure sensitivity of response in the clockwise and counterclockwise directions, and even then the excitation and reciprocity of opposite waves may not be identical. Dual couplers introduce more loss to the ring, thereby degrading its performance limit as a gyro. When both traveling wave resonances are excited in the resonant ring simultaneously, there will be interference from coherent backscattering and also from non-linear interactions due to the high electric field amplitudes at resonance that will be environmentally dependent, resulting in degrading gyro performance.

SUMMARY OF INVENTION

It is therefore an object of this invention to provide an improved resonant-ring optical gyro using either optical-fiber rings or deposited wave-guide rings with inherent enhanced, high-order, resonance suppression.

It is a further object of this invention to provide such a resonant-ring optical gyro which uses frequency difference rather than interference pattern phase shift detection.

It is a further object of this invention to provide such a resonant-ring optical gyro which employs an optical fiber that is one or two orders of magnitude shorter in length than required for a Sagnac interferometer optical gyro.

It is a further object of this invention to provide such a resonant-ring optical gyro capable of separating the response to the two orthogonal states of polarization and suppressing one or advantageously using both to sense rotation rate.

It is a further object of this invention to provide such a resonant-ring optical gyro which introduces lower optical loss in the ring.

It is a further object of this invention to provide such a resonant-ring optical gyro which engenders common mode rejection of phase variations at a port used for both input and output.

It is a further object of this invention to provide such a resonant-ring optical gyro which produces identical mode excitation of oppositely directed traveling waves including identical distributions between orthogonal states of polarization.

It is a further object of this invention to provide such a resonant-ring optical gyro which is easier and less costly to make.

It is a further object of this invention to provide such a resonant-ring optical gyro which eliminates first-order interference from coherent backscattering.

It is a further object of this invention to provide such a resonant-ring optical gyro which eliminates first-order interference from backward wave scattering associated with non-linear interactions which arise in dielectric material when the electric field amplitudes of light waves are high.

The invention results from the realization that an improved resonant-ring optical gyro can be made using an optical fiber resonant ring with single evanescent-wave directional coupling for both the input excitation and the output response detection by rapidly alternating excitation between two oppositely directed traveling wave resonances and by separating orthogonal polarization states through design and active control means.

This invention features a single directionally coupled guided-wave passive resonant-ring optical gyro system responsive to a coherent light source. There is an optical-fiber resonant ring and a single directional coupler which serves as an input for exciting the clockwise and counterclockwise traveling waves in the resonant ring and which serves as an output for extracting the output signals representative of those resonant travelling waves. Switching means selectively alternately direct the light waves from the coherent light source to the clockwise and counterclockwise inputs of the single directional coupler. There are means for tuning the optical frequency of the input light waves. There are means for separating the resonant frequencies of the orthogonal polarization states of the input light waves. There are means for sensing the output signals representative of the clockwise and counterclockwise traveling waves resonances of the resonant ring.

In a preferred embodiment the means for separating the resonant frequencies of the orthogonal polarization states includes proper orientation of the splice in the ring at the time it is welded, and the use of a piezoelectric stressor to apply stress to the fiber to alter the birefringence and thereby control the separation of resonant frequencies. The means for controlling the excitation level of the orthogonal states of polarization includes an integrated-optics half-wave polarization element and input and output integrated-optics polarization filters. The means for frequency tuning includes an integrated-optics type of modulator such as a Mach-Zender interferometer. The switching means may include an integrated-optics evanescent-wave delta-beta crossbar switch.

DISCLOSURE OF PREFERRED EMBODIMENT

Other objects, features and advantages will occur from the following description of a preferred embodiment and the accomanying drawings, in which.

Figure 1:
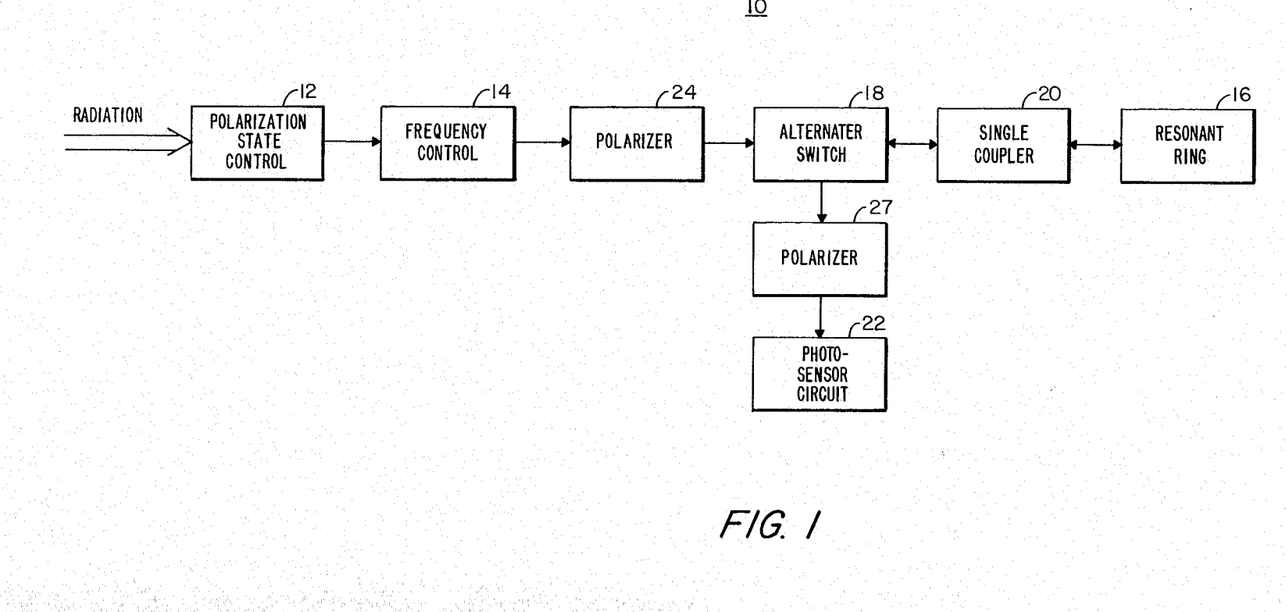
FIG. 1 is a block diagram of the optical system of a single directional coupler guided-wave passive resonant-ring optical gyro instrument according to this invention.

There is shown in FIG. 1 a single-coupler guided-wave passive resonant-ring optical gyro system 10 according to this invention. Polarization control 12 alters the polarization state of the incoming coherent radiation to match one of the normal modes of polarization of the resonant ring 16 and maximize power transfer through identical polarizing filters 24 and 27. Frequency control 14 tunes in a predetermined sequence the optical frequency of the incoming coherent radiation to match and excite the resonant modes of resonant ring 16. The output coherent radiation from frequency control 14 is delivered through polarizing filter 24 and then through alternator switch 18 to the single coupler 20. Alternator switch 18 directs the input of coherent radiation to the inputs of single coupler 20, first in one interval of time to flow in one direction and then in the next interval of time to flow in the other direction, while simultaneously extracting output signals from first, in the first interval of time, the other direction and then, in the next interval of time, the one direction, respectively. The output coherent radiation from the alternator switch 18 is delivered through polarizing filter 27 to photosensor circuit 22, which typically detects the frequency difference between the outputs representative of the resonance conditions of the ring for the two counterpropagating directions of coherent radiation travel in resonant ring 16. The frequency difference is indicative of the rate of inertial rotation of the gyro.

Figure 2:
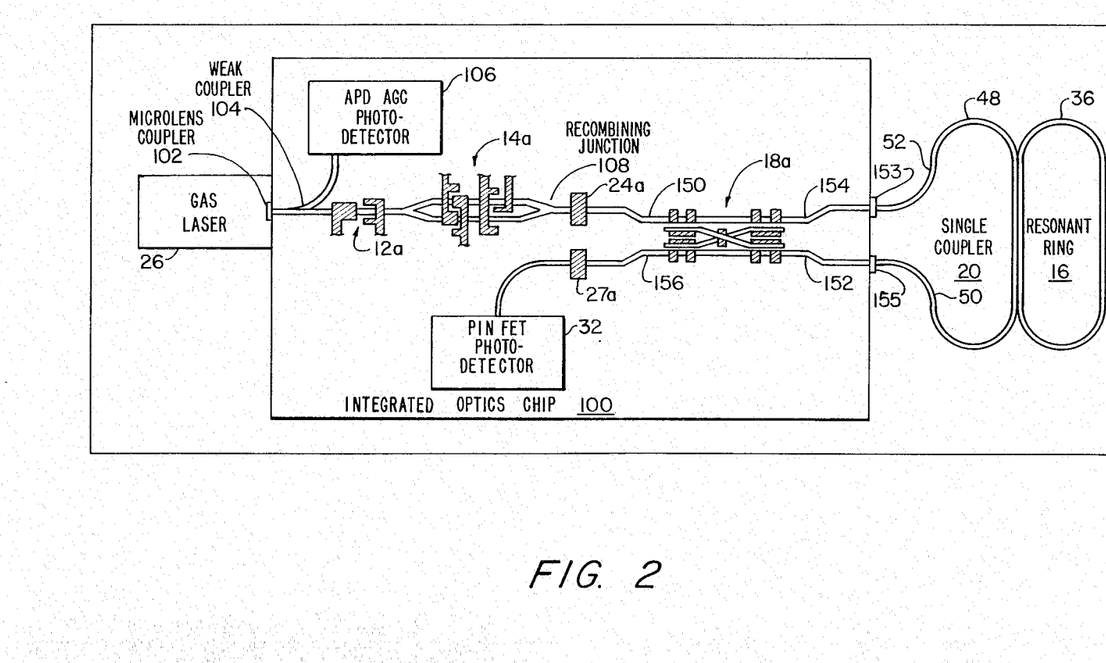
FIG. 2 is a more detailed block diagram of the input and output conditioning system for the light beams of the gyro instrument of FIG. 1.

In one embodiment, FIG. 2, the coherent light source includes a helium-neon gas laser 26 with a wavelength of 1.15 microns. The beam conditioning functions of polarization control, frequency control, polarizing filtering, switching, and photodetection are performed by integrated optics chip 100, comprised of a network of deposited dielectric waveguides 102 and electrodes for applying stresses to the waveguides at selected locations, and specifically including a weak coupler 104 to transfer a small portion of the coherent radiation from gas laser 26 to photodetector 106 to be used to provide an automatic gain control reference signal; a polarization state rotator control 12a consists of waveguide and electrode configurations that alter the direction of polarization for the purpose previously mentioned; an optical frequency control 14a consists of a split waveguide path in the a Mach-Zender interferometer; and electrodes for differentially modulating the phase velocities in the two arms of the split waveguide, so that the waves which are recombined at recombining junction 108 will have a dominant single side band at an optical frequency which is the sum of the optical frequencies of gas laser 26 and the applied modulation to the electrodes, an input polarizing filter 24a in conjunction with an identical output polarizing filter 27a guarantees reciprocity (according to the Lorentz reciprocity theorem) for the detected power from the counterpropagating coherent radiations in resonant ring 16; a 2×2 crossbar switch 18a for performing the aforementioned function of the alternator switch 18; and a PIN-FET type of photodetector 32 which is the photodetection element in the aforementioned photosensor circuit 22.

Crossbar switch 18a is used to periodically and rapidly reverse the input and output roles of the two optical fiber leads 50, 52, of coupler 20. When no voltage is applied to the electrodes of crossbar switch 18a the switch is a directional coupler; that is, light incident on the switch from wave guide port 150 crosses over to exit at wave guide port 152 and can excite the clockwise traveling wave resonance in the optical fiber ring 16. The output power dip signal returns on port 154, which leads to output polarizing filter 27a and then to photodetector 32. With appropriate voltages applied to the electrodes, the crossover coupling is destroyed by producing a mismatch between the phase velocities in adjacent waveguides. Thus light incident from port 150 passes through to port 154 without crossover and can excite the counterclockwise traveling wave resonance in the optical fiber ring 16. The output power dip signal returns on port 152 and passes through the switch to port 156, which leads to polarizing filter 27a and then to photodetector 32 without crossover. Normally, an alternating signal is provided to the electrodes of crossbar switch 18a, causing it to alternate the excitation of the crosswise and counterclockwise resonances of the optical fiber ring 16. The switching rate is only limited by the decay time of the resonant field in the optical fiber ring 16; thus switching can be done at rates as high as 10,000 cycles/second. The single coupler is formed by methods well known to those versed in the art.

Figures 3, 4:
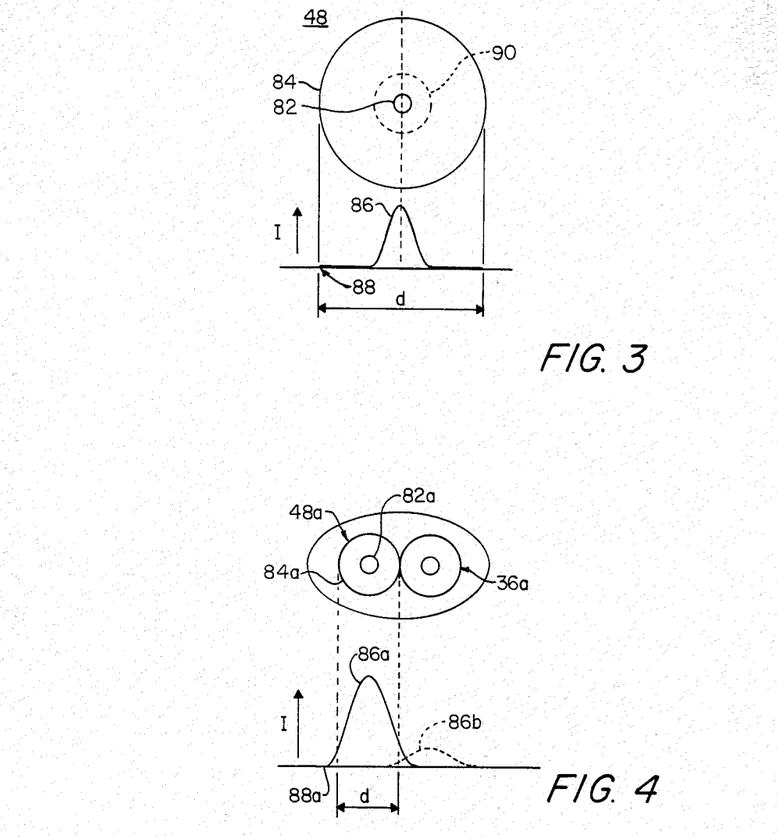
FIG. 3 is a sectional view of the single-mode optical-fiber element with a graph showing the distribution of the intensity of the guided light centered at the core.
FIG. 4 is a sectional view of the fiberoptic coupler element and the resonant ring element in the evanescent-wave coupling region where the fibers are etched to smaller diameter and embedded in an optical index matching material, and a graph showing the light-intensity distribution in that element.
Figure 5:
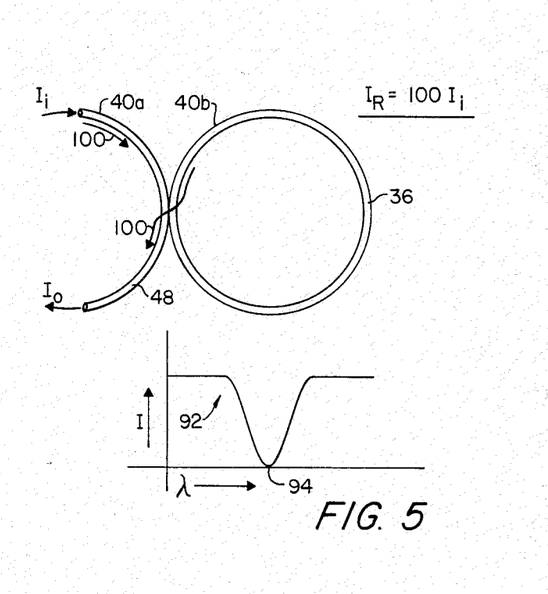
FIG. 5 is a schematic diagram showing the light paths in the coupler and resonant ring for an input that excited counterclockwise waves, and a graph showing the intensity dip in that output light intensity as a function of optical-frequency tuning through the resonant frequency of the resonant ring.

Typically, fiberoptic element 48, FIG. 3, has a core 82 and a surrounding clad 84. The clad is typically much greater than core 82 so that the intensity distribution of light within the fiber 86, while peaked at core 82, falls off to nearly zero at the edge 88 of clad 84. To allow element 48 to be used for coupling, the clad 84 is reduced in diameter in the coupling region of the optical fiber, as shown at 90. This is accomplished by etching a segment of the fiber in hydroflouric acid. This results in a new fiberoptic 48a, FIG. 4, with a clad 84a of much smaller outer diameter. The distribution of light intensity remains unaltered with the peak 86a still concentrated in core 82a; however, the fall-off is such that some light energy escapes through clad surface 84a at points 88a and enters the neighboring resonant-ring fiberoptic element 36a, which has been constructed in the same manner as fiberoptic 48a. Element 36a then carries an energy distribution of much lower level, as indicated at 86b. Initially, with the two fiberoptic elements 48a and 36a arranged as shown, and with the input intensity, $I_i$, FIG. 5, constant and with the output intensity, $I_o$, constant, a small amount, designed typically to be approximately 1%, of the energy leaks, i.e., is coupled, across the boundary from element 48 to element 36. However, as resonance is approached by tuning the optical frequency of the input light, the intensity $I_R$ of the traveling wave in the resonant element 36 through a process of constructive interference increases to typically 100 times the intensity of $I_i$. At this point the leakage from element 36 back to element 48 is approximately equal to the input $I_i$ at element 48 but is out of phase with input $I_i$ so that the intensity $I_o$ decreases. The decrease becomes stronger with frequency tuning, as indicated by intensity characteristic 92, until at resonance 94 the dip or decrease in output $I_o$ is at a maximum, i.e., the output is at a minimum. In practice, in order to confine the lossiness due to external radiation leakage from the two elements 48 and 36, which results because their core diameters are reduced, the two elements 48a and 36a in the area of the coupling joint are immersed in a potting material which is chosen to have an index of refraction similar to that of the cladding glass. This reduces energy loss in all directions except for the transfer across the interface between fiberoptic elements 48a and 36a.

As indicated previously, a piezoelectric stressor device, or squeezer, acting directly on the optical fiber of ring 36, may be used to control the separation of the orthogonal polarization states, either set once initially or else continuously adjusted during operation as a part of a feedback system coupled to the polarization control 12a. In addition, at initial splicing of the ends of the optical fiber to form resonant ring 16a, fiberoptic element 36 may have its two ends rotated in the azimuth relative to one another prior to welding, so that the separation in optical frequency of the polarization states is permanently set in the ring.

Rather than suppress one of the orthogonal polarization states, it may be advantageous after separation to utilize both of them to achieve a four-wave laser gyro instrument configuration. One specific advantage is that if an additional bias is applied, for example by the use of a longitudinal magnetic field to cause a nonreciprocal Faraday effect, then the clockwise and counterclockwise waves of one of the polarization states will shift their optical frequencies away from each other as a function of rotation rate, while the optical frequencies of the clockwise and counterclockwise waves of the other polarization state will move toward each other as a function of the rotation rate, thereby providing with proper additions and subtractions of the optical frequencies, as known in the state of the art, cross-compensation for any bias distortion which has been introduced.

Figure 6:
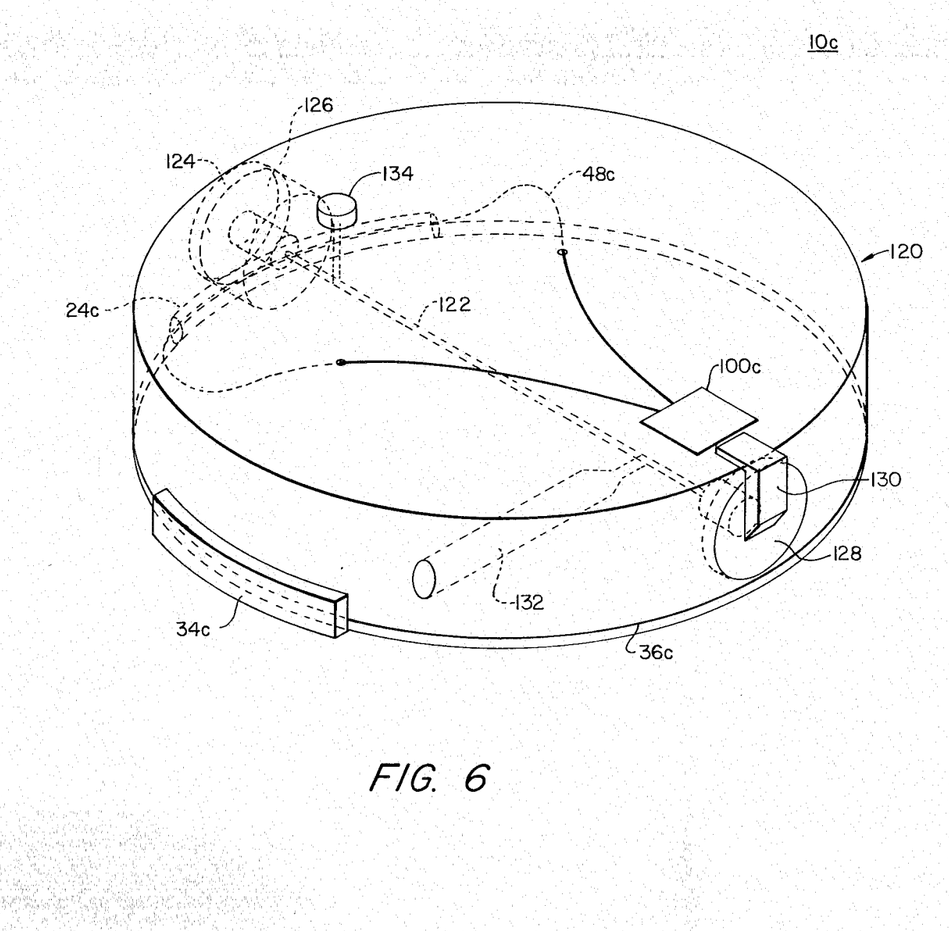
FIG. 6 is an axonometric view of an optical-fiber resonant-ring gyro system according to this invention fabricated in a machined or molded block.

The system of this invention may be constructed in a molded block of material with low coefficients of thermal expansion such as Cervit or Zerodur (trade names), 120, FIG. 9, in which the resonant ring of fiberoptic element 36c is mounted along the lower cylindrical edge and interfaces with the single coupler fiberoptic element 48c and the optical fiber directional coupler 24c. The laser channel 122 extends diametrically across block 120 between laser mirror 124 which is mounted on piezoelectric cavity length driver at one end and laser mirror 128 and turning prism 130 at the other end. Cathode channel 132 and anode cap 134 are also provided in block 120. Fiberoptic element 48c interconnects directly with integrated optic substrate 100c and a piezoelectric squeezer or stressor 34c is disposed on the lower edge of block 120 proximate to fiberoptic element 36c.

In general, a resonant optical-fiber ring is a coiled length of optical fiber with its two butt ends spliced to form an endless optical circuit. A traveling electromagnetic wave in the ring, circulating at the speed of light (c/n), for example in the clockwise direction, where c is the free space speed of light and n is the index of refraction, destructively interferes with itself unless its wavelength ($\lambda$) satisfies the condition $\lambda = l/N$, where N is a large integer and l is the total path length around the ring. That is, there must be a whole-integer number of wavelengths along the optical path length. When this condition is satisfied the ring is said to be operating at a resonant frequency, $f_N$, of the Nth mode, where $$f_N = \frac{c}{n} \frac{N}{l}$$

In a ring that is not rotating in inertial space about its axis the optical path length in the clockwise (cw) direction appears to an observer on the ring to be the same as the optical path length in the counterclockwise (ccw) direction:

$$f_{N,cw} = f_{N,ccw}$$

But if the ring is rotating, e.g., at a rate $\omega$ (rad/s) in the ccw-direction, then an observer (or photodetector) sitting on the ring platform observes that the path length in the cw-direction seems longer than in the ccw-direction. Thus, there appears to the observer or photodetector fixed on the ring a frequency difference between those cw and ccw resonances that have the same value of N of $\Delta f = f_{N,ccw} - f_{N,cw} = f_B$, where it can be shown that:

$$f_B = \frac{4A}{\lambda l} \omega$$

where A = area enclosed by the coiled ring of optical fiber.

In the conventional type of ring-laser gyro the two resonances, $f_{N, cw}$ and $f_{N,ccw}$ are automatically sustained by the laser gas (which amplifies light) that is within the optical ring path. In the optical fiber there is no active optical amplifier such as the laser gas within the ring. Therefore, the two resonances are measured by observing the response of the ring to some external optical-frequency tunable narrow-band light source, usually also a gas laser. The frequency of the external optical-frequency-tunable laser-light source is tuned through the resonance frequencies of the ring while observing the response of the ring. The frequency search and lock-on to the resonance line-centers of the cw- and ccw-waves and the measurement of the difference frequency between the resonance line-centers is accomplished in the gyro system by control and measurement electronic circuits.

Figure 7:
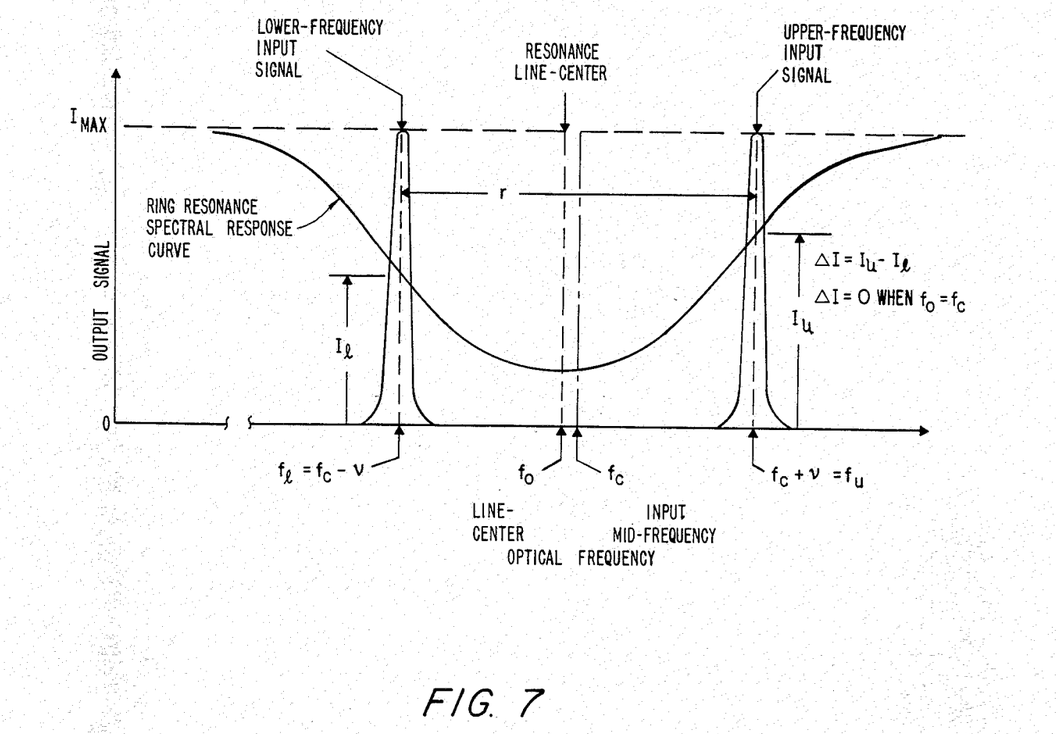
FIG. 7 is an illustration of the physical basis of the balance output technique for determining line centers in the resonant-ring gyro.

One approach to line center measurement is based on defining the line center of a resonance ($f_o$), FIG. 7, as the frequency which is halfway between the frequencies ($f_u$ and $f_l$) of two input signals when their frequencies are mutually shifted in unison until the output response amplitudes ($I_u$ and $I_l$) are equal, i.e., $I_u - I_l = 0$. The input signals have a fixed frequency separation ($\Gamma = f_u - f_l$) and are tuned in unison to maintain this fixed separation. The mid-frequency, $f_c = (f_u + f_l)/2$, is tuned until the balance condition is achieved (i.e., $I_u = I_l$ and $f_c - f_o = 0$). In practice it is not necessary to exactly achieve balanced outputs. For $|f_c - f_o|/\Gamma << 1$, the unbalance in output signals ($\Delta I$) is approximately proportional to the detuning between the mid-frequency of the input signals and the center of the resonance line, i.e., $f_c - f_o \cong -K\Delta I$. Thus, during rapid dynamic maneuvers of the gyro platform, when the characteristic time to lock into balance may be too large, the unbalance signal still provides an estimate for the frequency of the resonance line-center. The input signals are applied alternately, not simultaneously.

Figure 8:
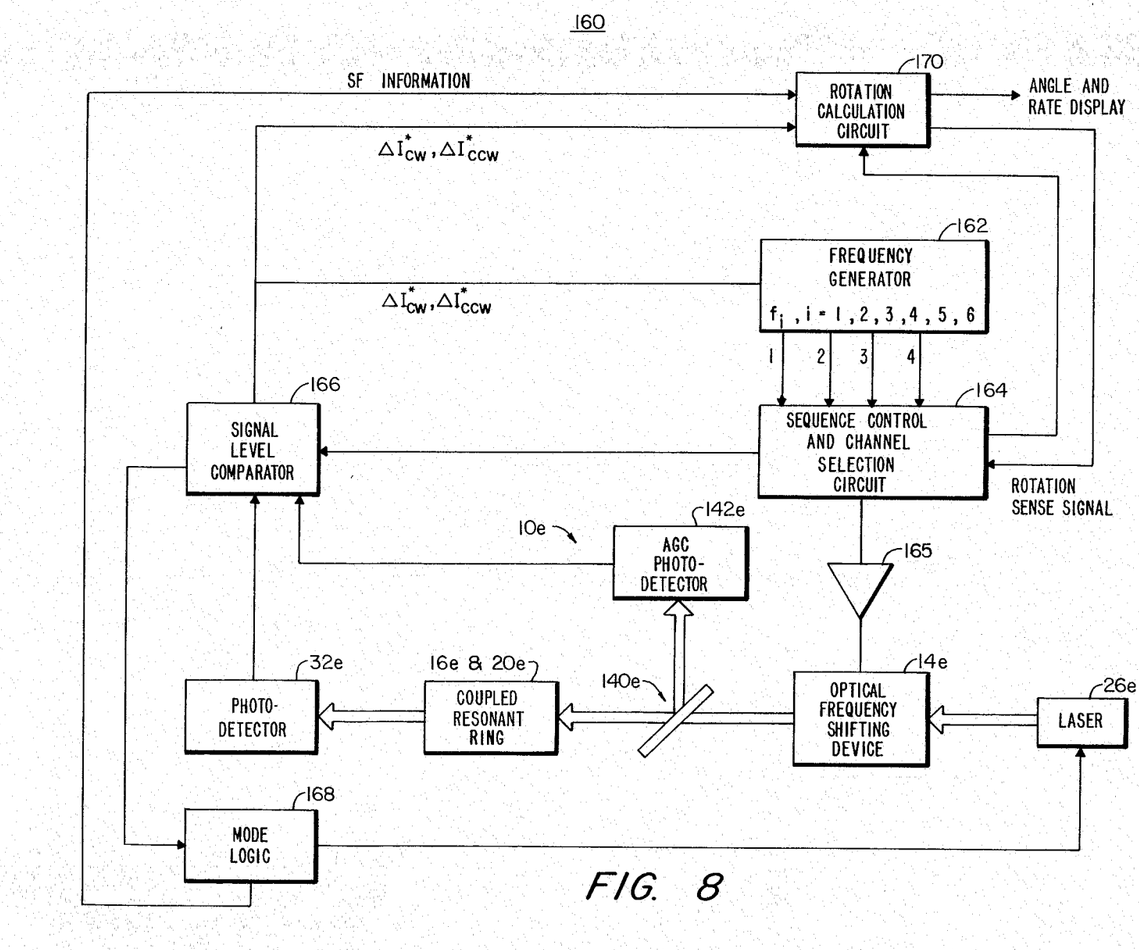
FIG. 8 is a block diagram of the control and measurement electronics which may be used with the gyro system according to this invention.

In control and measurement electronics 160, FIG. 8, two pairs of electronic frequencies ($f_1$ and $f_2$) and ($f_3$ and $f_4$) are generated in frequency generator 162 from a single signal by state of the art frequency multiplication and heterodyning techniques. The two signals in each pair have a fixed frequency separation $\Gamma$, i.e., $f_2 - f_1 = \Gamma$ and $f_4 - f_3 = \Gamma$. The midfrequency of the optical frequency $f_{cw} = \frac{1}{2}(f_1 + f_2) + f_o$ is adjusted, as described below, until it coincides with the center frequency of the clockwise traveling-wave resonance of the ring ($f_{o,cw}$). Similarly, the midfrequency of the optical frequency $f_{ccw} = \frac{1}{2}(f_3 + f_4) + f_o$ is adjusted until it coincides with the center frequency of the counterclockwise traveling-wave resonance of the ring ($f_{o,ccw}$). The four signals are applied in a repetitive sequence, one at a time, to the optical frequency shifting device 14e. Circuit 164 accomplishes the sequencing of the frequencies in precise and equal time intervals (t). Signal level comparator 166 compares $I^*_1$ with $I^*_2$ and compares $I^*_3$ with $I^*_4$ to generate the unbalance signals $\Delta I^*_{cw} = I^*_2 - I^*_1$ and $\Delta I^*_{ccw} = I^*_4 - I^*_3$. The asterisk on the $I_i$ values indicates the following normalization process:

$$\left. \begin{array}{l} I^*_i = \dfrac{1}{\Delta t} \displaystyle\int_t^{t+\Delta t} I_i^{(1)} \, dt \\[6pt] I_i^{(1)} = I_i \dfrac{i_{AGC,NOM}}{i_{AGC}} \end{array} \right\} \quad (i = 1, 2, 3, \text{ or } 4)$$

The normalization process insures that corrections are performed for variations in both the measurement time interval and the laser output intensity. The electronic signal $i_{agc}$ is generated in the AGC photodetector, which samples approximately 5% of the laser beam.

Sequence control and channel selection 164 also controls the 2×2 crossbar switch 18a, not shown in FIG. 8. Input/output configuration is established so that the cw wave is excited when frequencies $f_1$ and $f_2$ are applied and the ccw-wave is excited when frequencies $f_3$ and $f_4$ are applied. The unbalance signals $\Delta I^*_{cw}$ and $\Delta I^*_{ccw}$ generated when $f_{c,cw} \neq f_{o,cw}$ and $f_{c,ccw} \neq f_{o,ccw}$ are applied to mode logic 168 and to frequency generator 162, which changes frequency multipliers to drive $f_{c,cw}$ and $f_{c,ccw}$ toward the frequencies $f_{o,cw}$ and $f_{o,ccw}$, respectively. The difference is $$f_{c,cw} - f_{c,ccw} = f_B$$

if $\Delta I^*_{cw} = \Delta I^*_{ccw} = 0$, or if $\Delta I^*_{cw} = \Delta I^*_{ccw} = \Delta I$. When $\Delta I^*_{cw} = \Delta I^*_{ccw}$, but $\Delta I / I << 1$, then $$f_{c,cw} - K\Delta I^*_{c,cw} - f_{c,ccw} + K\Delta I^*_{ccw} \cong f_B$$

(i.e., when small unbalances are present). For large unbalances a higher order polynomial in the $\Delta I^*$-values is required. The calculations of $f_B$ are performed by the logic in the rotation calculation circuit 170.

Other embodiments will occur to those skilled in the art and are within the following claims:

What is claimed is:

1. A single-coupler guided-wave passive resonant-ring optical gyro instrument responsive to a coherent light source, comprising:
   an optical-fiber resonant ring;
   a single wave coupler for exciting input clockwise and counterclockwise traveling waves in said resonant ring and for extracting the output signals representative of the level of excitation of those waves;
   switching means for selectively, alternately applying the light waves from the coherent light source to the clockwise and counterclockwise inputs of said single wave coupler;
   means for selectively exciting the orthogonal polarization states of the optical modes of the resonant ring;
   means for separating the orthogonal polarization states of the optical modes of the resonant ring;
   means for tuning the optical frequency of the input light waves to match and track the resonant frequencies of said resonant ring; and
   means for sensing said output signals representative of the level of excitation of the clockwise and counterclockwise waves in the resonant ring.

2. The single-coupler guided-wave passive resonant-ring optical-gyro instrument of claim 1 in which said switching means includes an evanescent-wave directional coupler delta-beta switch.

3. The single-coupler guided-wave passive resonant-ring optical-gyro instrument of claim 1 in which said means for tuning includes a modulated Mach-Zender interferometer.

4. The single-coupler guided-wave passive resonant-ring optical-gyro instrument of claim 1 in which said means for switching includes a cross-bar switch.

5. The single-coupler guided-wave passive resonant-ring optical-gyro instrument of claim 1 in which said single wave coupler is an evanescent-wave directional coupler.

6. The single-coupler guided-wave passive resonant-ring optical gyro instrument of claim 1 in which said means for separating includes a coupling joint.

7. The single-coupler guided-wave passive resonant-ring optical gyro instrument of claim 1 in which said means for separating includes a polarization state rotator.

* * * * *